(12) United States Patent
Platt

(10) Patent No.: US 8,998,550 B2
(45) Date of Patent: *Apr. 7, 2015

(54) HARDWARE ATTACHMENT SYSTEM

(71) Applicant: James Michael Platt, Apollo Beach, FL (US)

(72) Inventor: James Michael Platt, Apollo Beach, FL (US)

(*) Notice: Subject to any disclaimer, the term of this patent is extended or adjusted under 35 U.S.C. 154(b) by 194 days.

This patent is subject to a terminal disclaimer.

(21) Appl. No.: 13/763,801

(22) Filed: Feb. 11, 2013

(65) Prior Publication Data

US 2014/0227061 A1    Aug. 14, 2014

(51) Int. Cl.
*F16B 25/00* (2006.01)
*E05D 1/00* (2006.01)
*F16B 35/06* (2006.01)

(52) U.S. Cl.
CPC .............. *E05D 1/00* (2013.01); *F16B 25/0042* (2013.01); *F16B 35/06* (2013.01)

(58) Field of Classification Search
USPC ................... 411/386, 411–413, 387.7, 387.8; 16/384

IPC ..................... F16B 25/0031, 25/0057
See application file for complete search history.

(56) References Cited

U.S. PATENT DOCUMENTS

| | | | |
|---|---|---|---|
| 205,990 A * | 7/1878 | Armstrong | 411/413 |
| 4,621,963 A * | 11/1986 | Reinwall | 411/369 |
| 5,403,136 A * | 4/1995 | Mathys | 411/310 |
| 5,709,686 A | 1/1998 | Talos et al. | |
| 5,904,683 A | 5/1999 | Pohndorf et al. | |
| 5,909,992 A * | 6/1999 | Wu | 411/387.4 |
| 6,322,562 B1 | 11/2001 | Wolter | |
| 6,955,677 B2 * | 10/2005 | Dahners | 606/287 |
| 7,179,260 B2 | 2/2007 | Gerlach et al. | |
| 8,425,574 B2 * | 4/2013 | Huebner et al. | 606/281 |
| 8,556,985 B2 * | 10/2013 | Meridew | 623/22.36 |
| 2003/0143057 A1 * | 7/2003 | Shinjo | 411/387.1 |
| 2008/0118332 A1 * | 5/2008 | Lamb | 411/411 |

* cited by examiner

*Primary Examiner* — Gary Estremsky
(74) *Attorney, Agent, or Firm* — Lonnie R Drayer

(57) ABSTRACT

A system for attaching an article of hardware to another article made of wood, particle board, plastic or fiberglass. The article of hardware is provided with at least one through hole and the article of hardware is fixed to the other article by a screw that extends through a through hole into the article of hardware. A head of the screw is fixed to the article of hardware by threads located on a tapered shank of the screw.

23 Claims, 11 Drawing Sheets

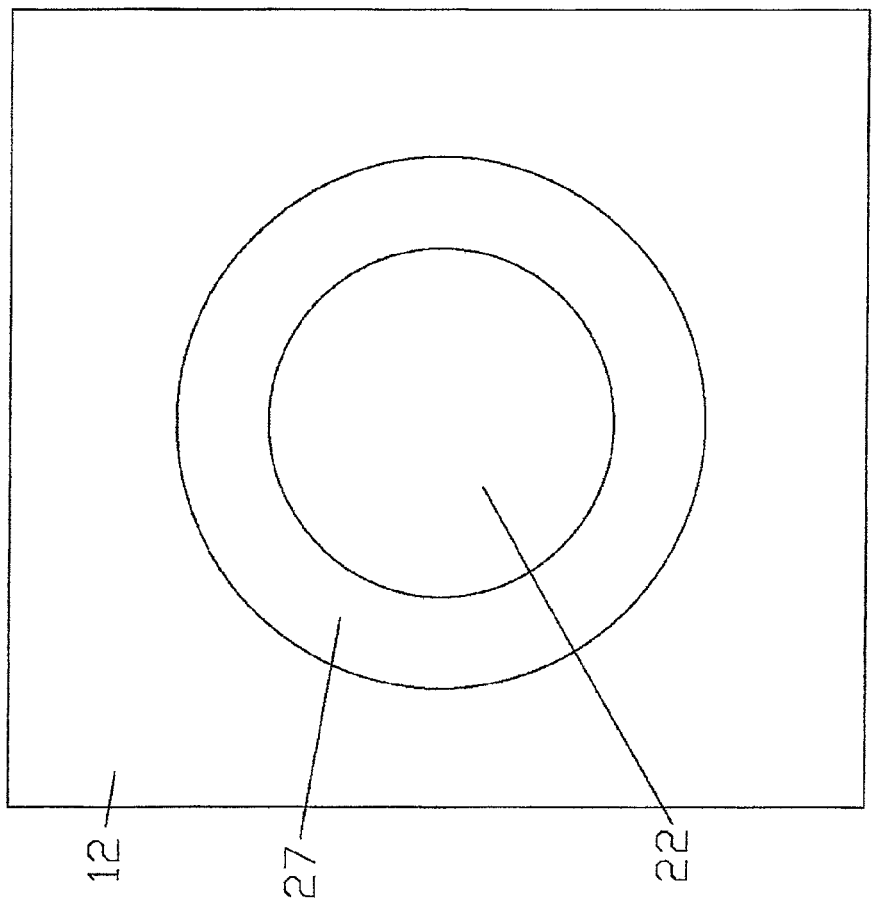
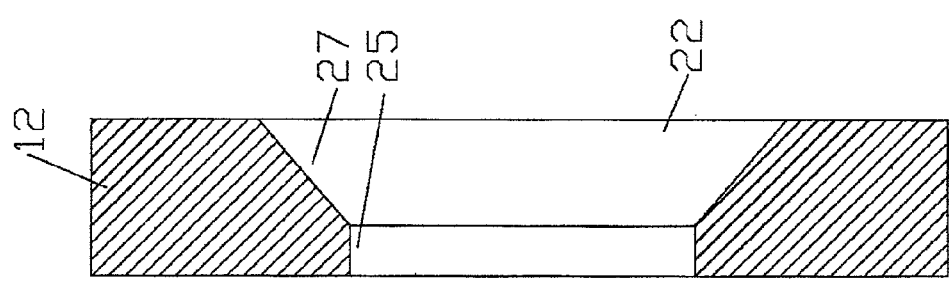

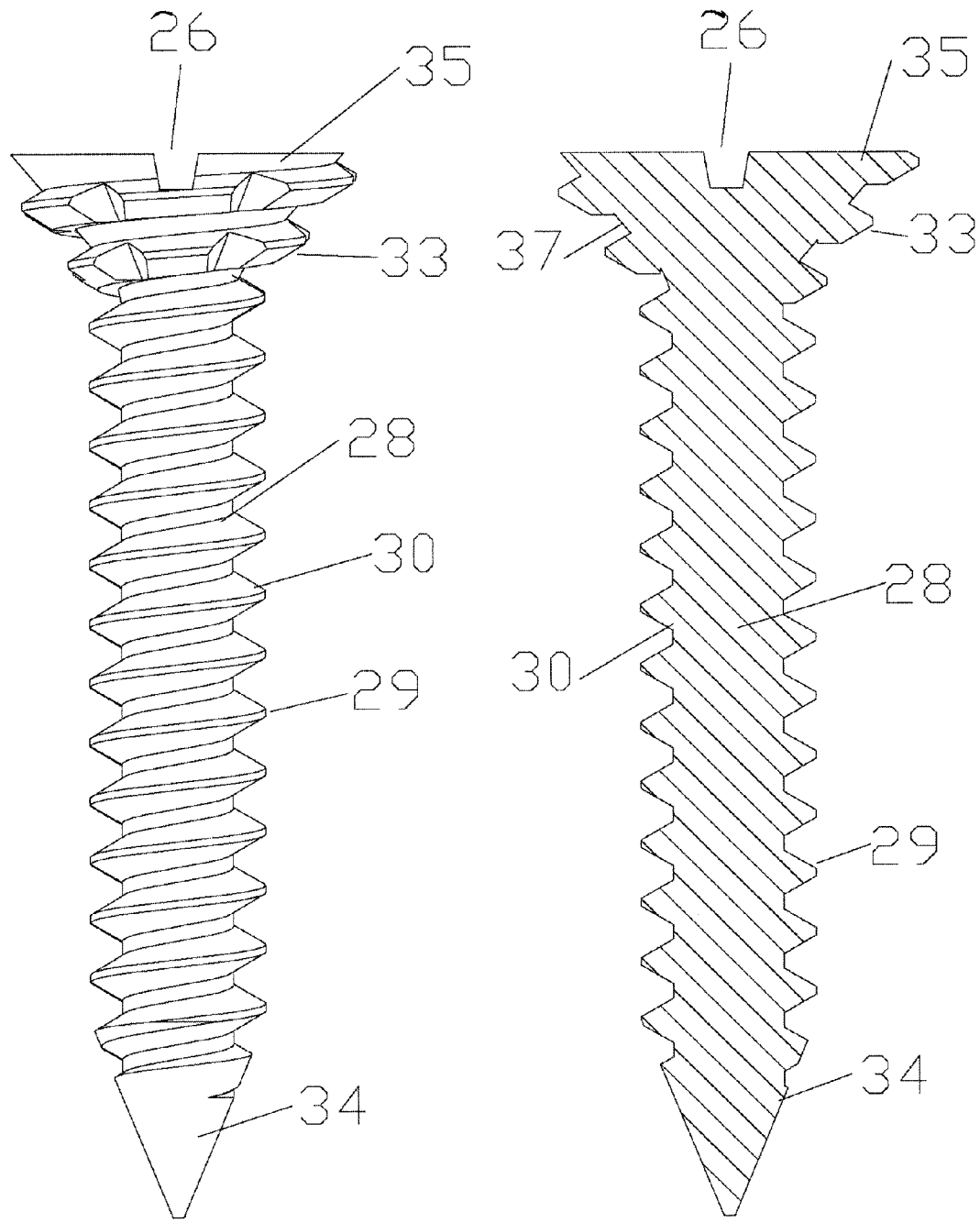

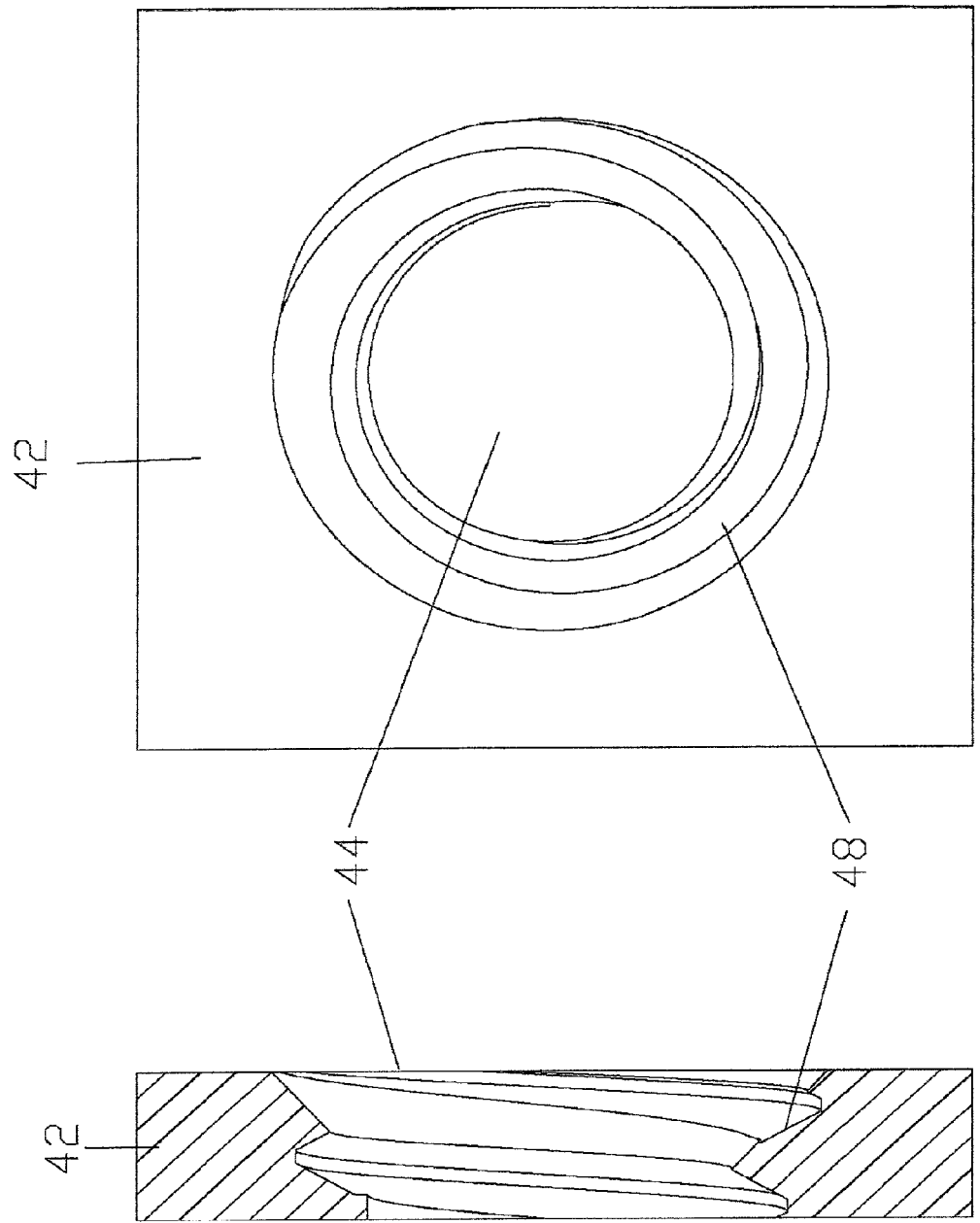

HARDWARE ATTACHMENT SYSTEM

FIELD OF THE INVENTION

The present invention relates to a system for attaching hardware to a structure using locking head screws.

BACKGROUND OF THE INVENTION

Metal devices, commonly referred to as hardware, such as fittings, fixtures, fasteners, hinges, pulls, knobs, hangers, are conventionally attached to wood, particle board, plastic or fiberglass structures using threaded fasteners that extend through passages in the metal device (hardware). It is common that over time the threaded fasteners become loosened from the structure and allow the hardware to become displaced. In the case of hinges the operation of the associated door is impaired such that over time the threaded fastener and the hinge may become totally disengaged from the door or doorframe. Similar problems are encountered when fastening other items of hardware, such as door pulls, hangers, shelf brackets, curtain rods and so forth. The hardware fastening system of the present invention provides a method of preventing the disengagement of threaded fasteners and the associated hardware from wood, particle board, plastic or fiberglass structures or similar non-metallic materials.

DISCUSSION OF THE PRIOR ART

U.S. Pat. No. 5,709,686 teaches a bone plate for joining together segments of a broken bone. The elongated bone plate has through holes, at least some of which have a partial threaded portion of the hole for seating a bone screw having a threaded head.

U.S. Pat. No. 5,904,683 teaches an implantable device, in the form of a plate, for affixing to the anterior side of cervical vertebrae for stabilizing the cervical vertebrae column. The head of the screw is not threaded, but when the screw extends through a through hole in the implantable device the head is secured in place by a separate locking cap that is threadably received within the through hole while the head of the bone screw is disposed in the through hole for engaging and frictionally locking the head of the bone screw to the plate.

U.S. Pat. No. 6,322,562 teaches a fixation system for bones including a connection carrier with at least one passage hole and at least one bone screw inserted into a passage hole. The bone screw includes a preformed thread. The preformed head deforms a portion of a passage hole of the connection carrier when the bone screw is screwed in so that a thread connection is formed between the bone screw thread and the connection carrier.

U.S. Pat. No. 7,179,260 B2 teaches bone plates with through holes that are threaded to mate with threads on the head portion of a bone screw. The through holes are configured for interchangeably receiving locking a compression screws for proper fixation of a damaged bone.

U.S. Pat. No. 5,709,686, U.S. Pat. No. 5,904,683, U.S. Pat. No. 6,322,562 and U.S. Pat. No. 7,179,260 B2 all relate to fastening a metal device to one or more bones that are living tissue in a human body. For the disclosed devices to work properly the bone or bones are required to heal or fuse to the screws that are used to fasten the devices to one or more bones. The healing and/or fusion normally is completed in about four to six weeks. In many instances the device and screws are removed from the body after the bone, or bones, is sufficiently healed or corrected. If healing or fusion does not occur within the expected time the device and screws may be removed and replaced with another device in the hope of achieving the desired results. However when a piece of hardware is attached to an article comprising wood, particle board, plastic or fiberglass structures or similar non-metallic materials it is normally hoped that the hardware will remain installed indefinitely. Heretofore there has been no known use or disclosure that screws that are attached to are attached by threads to both the hardware and the underlying article should be employed to achieve the goal of joining the hardware to the underlying structure for an indefinite period. A review of the very large variety of wood screws set forth in the Grainger® on-line catalog did not identify any wood screws having threads on the tapered shank portion of a screw below the head of the screw, whether ordinary threads or self tapping threads. The use of such screws in the manner disclosed in the detailed description of the present invention is therefore believed to be novel and unobvious.

SUMMARY OF THE INVENTION

There is provided in accordance with the present invention a system for attaching an article of hardware to another article comprising a material selected from the group consisting of wood, particle board, plastic and fiberglass, wherein the article of hardware is provided with at least one through hole and the article of hardware is fixed to the article by a screw that extends through a through hole in the article of hardware, wherein the a head of the screw is fixed to the piece of hardware by threads located on a tapered shank of the screw.

BRIEF DESCRIPTION OF THE DRAWINGS

FIG. 2 is a cross section of a through hole of the prior art hinge of FIG. 1.

FIG. 3 is a top view looking down on a portion of the prior art hinge of FIG. 1 in the region of a through hole.

FIG. 6 is an elevation view of a screw of the present invention having self tapping threads on the shank and head of the screw.

FIG. 7 is a cross section of the screw of FIG. 6.

FIG. 10 is a cross section of a threaded through hole of the hinge of FIG. 9.

FIG. 11 is a top view looking down on a portion of the hinge of FIG. 9 in the region of a through hole.

DETAILED DESCRIPTION OF THE INVENTION

As used herein and in the claims the term "hardware" is understood to have a common meaning of metal devices used as fittings, fixtures, fasteners, hinges, pulls, knobs, hangers and so forth when attached to a structural member of a stationery or movable article. The present invention relates to a system for attaching hardware to a structure using locking head screws wherein the screw is attached directly by threads to both the hardware and the structure.

Figure 1:
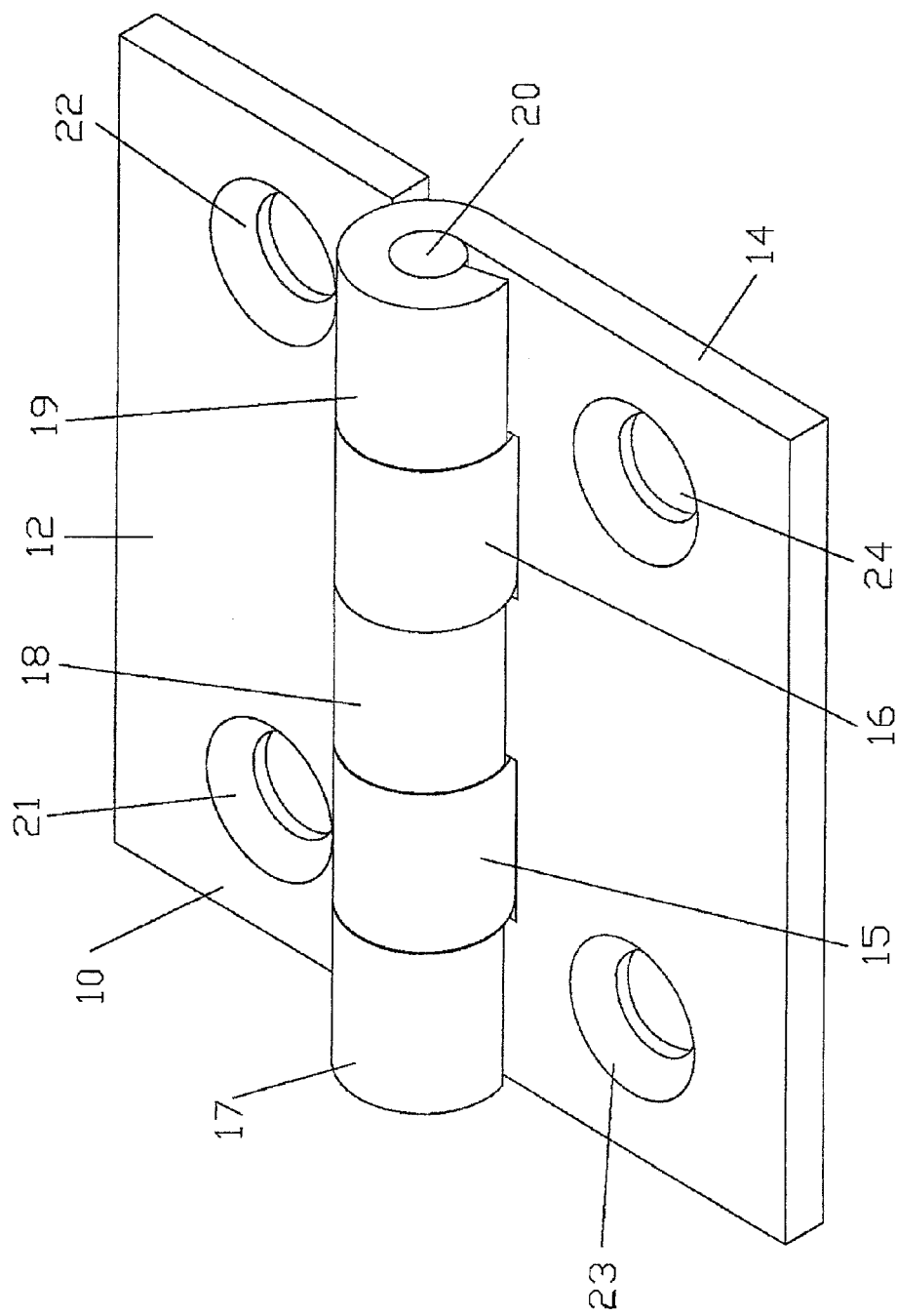
FIG. 1 shows an exemplary prior art hinge for attaching a door to a doorframe.

FIG. 1 shows an exemplary prior art hinge 10 used for attaching a door to a doorframe; FIG. 2 shows a cross section of a through hole 22 of the prior art hinge of FIG. 1; and FIG. 3 shows a top view looking down on a portion of the prior art hinge of FIG. 1 in the region of the through hole. The exemplary prior art hinge 10 has two hinge leaves 12, 14. One hinge leaf 12 is provided with three hinge eyes 17, 18 and 19. The other hinge leaf 14 is provided with two hinge eyes 15, 16. The hinge eyes are axially aligned and of substantially uniform internal diameter to slidably receive a hinge pin 20 of conventional construction. Each of the hinge leaves 12, 14 is provided with two through holes 21, 22; 23, 24 for receiving screws to securely fasten a leaf to a door or a door frame. As shown each of the through holes is counter sunk to present a tapered surface 27 that is complementary to a screw having a tapered head whereby the head of the screw does not protrude beyond a surface of the hinge leaf. In a conventional hinge the through holes 21, 22; 23, 24 for receiving screws are not threaded. Hinges are commonly made of plain, stainless or zinc-plated steel, but they are also widely available in brass, bronze, aluminum and other materials.

Figures 4, 5:
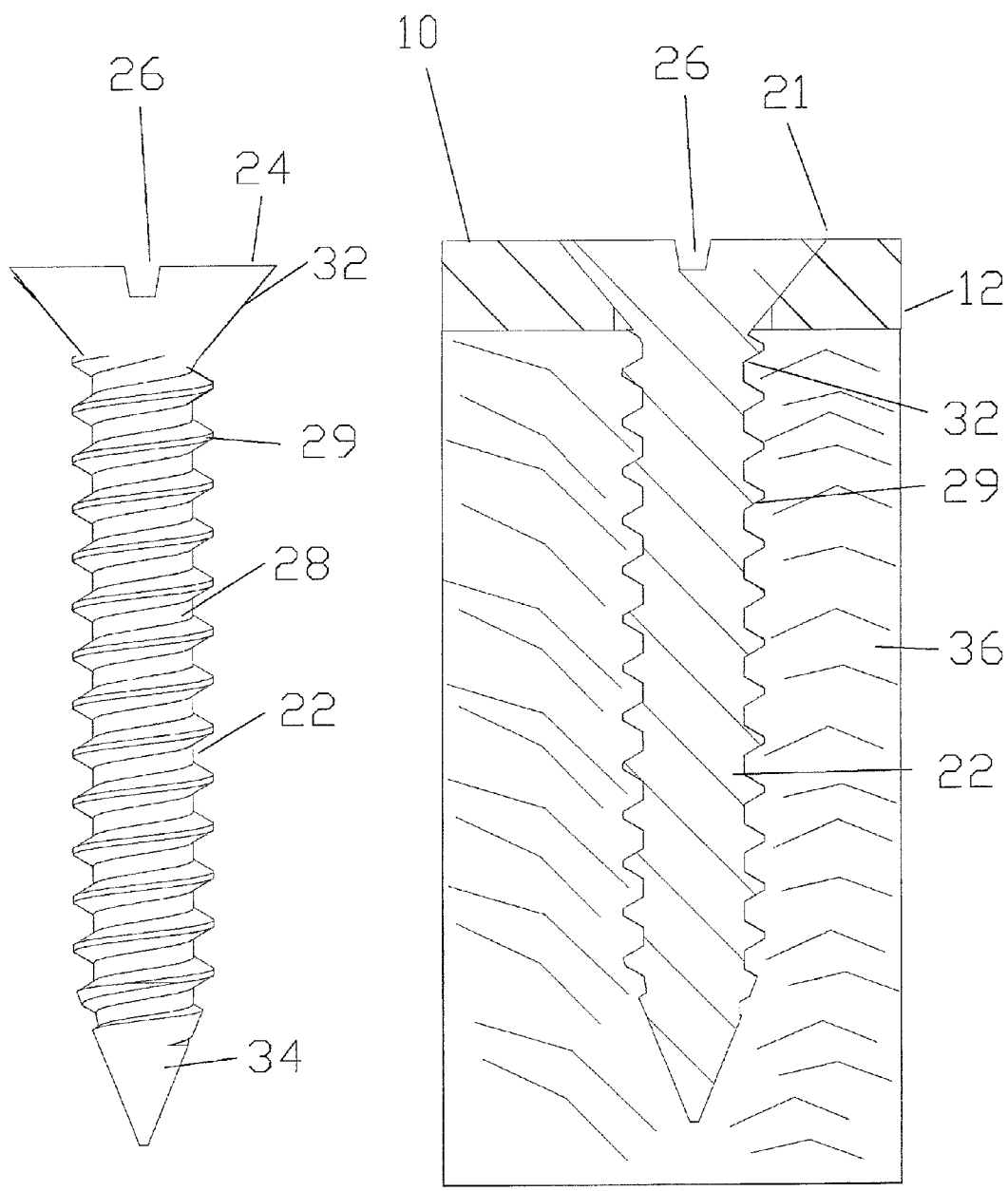
FIG. 4 is a typical prior art wood screw for fastening the prior art hinge of FIG. 1 to a door or door frame.
FIG. 5 is a schematic cross section of the prior art wood screw of FIG. 2 securing the prior art hinge of FIG. 1 to a wooden article.

FIG. 4 shows a typical prior art wood screw 22 for fastening the prior art hinge 10 of FIG. 1 to a door or door frame. The head 24 of a screw is the top portion, which is usually wider, that is to say has a greater diameter, than the rest of the screw and is provided with a recess such as a slot 26, cross or other specially shaped recess to fit the tip of a screwdriver, wrench or drill driver bit. The head of a wood screw intended for use with a hinge is usually flat. Most wood screws are right-handed, meaning they advance by being turned, or "driven," in a clockwise direction. The shaft 28 of the screw 22 is a cylinder that extends from the head 24 and is, at least in part, surrounded by a thread 29. In a wood screw, the shaft generally includes a smooth portion 32 called the shank that is located just below the head and tapers at the bottom to a narrow point 34. In a typical wood screw a tapered portion 32 of the head of the screw is smooth and not threaded. The thread 29, also known as a helical ridge or external thread, is the protruding edge that wraps around the shaft of the screw. In a wood screw, the thread typically extends from the smooth portion 32 (shank) of the shaft just below the head 24 of the screw to the end of the shaft. The shaft narrows to a fine point 34. The thread of a wood screw is designed to bore into the wood as the screw turns, lodging the screw in place, a process known as "self-threading". Wood screws are commonly made of plain, stainless or zinc-plated steel, but they are also widely available in brass, bronze, aluminum and other materials.

FIG. 5 is a fragmentary schematic cross section of the prior art wood screw 22 of FIG. 4 securing the prior art hinge 10 of FIG. 1 to a piece of wood 36 that may be a door or a door frame. The door or door frame, while shown as wood in this example, may comprise any suitable nonmetallic material selected from a group consisting of wood, particle board, plastic and fiberglass. The wood screw 22 extends through a through hole 21 of a hinge leaf 12 with the smooth, unthreaded shank 32 of the screw mating with a smooth, unthreaded surface of the through hole 21. The thread 29 of the screw is lodged in the wood 36 to retain the screw and the hinge adjacent to one another. When a door is secured to a door frame in the manner illustrated there may be a force exerted on the hinge in a direction perpendicular to the axis of the screw when the door is opened and closed, especially if a person must reach up or down to access the door. Over time the repeated opening and closing of a door may cause a loosening of the hinge from the door frame or door and the hinge may eventually become completely separated from the door frame or door. Retightening the hinge to the door or door frame may be difficult or impossible because during the separation of the hinge from the door or door frame the threads of the screw may damage the wood resulting in a hole that is too large to mate with the threads of a screw used to attach the hinge.

FIG. 6 is an elevation view of the wood screw 30 of the present invention having self tapping threads 33 on the shank 37 of the screw, and FIG. 7 shows a cross section of a wood screw of FIG. 6. Features of the new screw 30 disclosed herein that correspond to features of the prior art screw 22 of FIGS. 4 and 5 are commonly numbered to aid in identifying distinctions between the prior art screw 22 and the new screw 30. The threaded fastener or screw 30 has a shaft 28 with a head 35 located at one end of the shaft and a point 34 located at the other end of the shaft. The shaft 28 of the screw 30 is surrounded by a thread 29. The head 35 of the screw 30 is wider, that is to say has a greater diameter, than the rest of the screw. The head of the screw is provided with a recess such as a slot 26, cross or other specially shaped recess to fit the tip of a screwdriver, wrench or drill driver bit. A threaded fastener, or screw 30 of the present invention has a shank 37 located just below the head, but unlike the smooth shank of the prior art screw the shank of the screw 30 is provided with self tapping thread cutting threads 33 that cut a mating surface of a through hole of a metallic hardware device when the metallic hardware device is fastened to a non metallic structure comprising a suitable nonmetallic material selected from a group consisting of wood, particle board, plastic and fiberglass. This ability to cut threads into a wall of a through hole of a metallic hardware device is created by a gap in the continuity of the thread on the screw. The thread cutting feature is shown by the gaps of the self tapping thread cutting threads 33 of the wood screw of FIG. 6. That is to say the thread 29 on the shaft 28 of a screw of the present invention may be like any suitable thread of an ordinary prior art wood screw. Put another way, the thread on the shaft of a screw of the present invention is not a self tapping thread cutting thread. Unlike a normal prior art wood screw a threaded fastener, or screw 30 of the present invention has a tapered shank 37 provided with a self tapping thread cutting thread 33 located just below the head of the screw that cut a and removal material from mating tapered surface of a through hole of a metallic hardware device. Such a thread cutting arrangement may result in metal chips that are removed from the metallic hardware device. While these metal chips are not large, their presence in a situation such as the fastening of a hinge to a door or door frame is not harmful, but the production and presence of metal chips that may be deposited in a human body is objectionable. U.S. Pat. No. 6,322,562 teaches a fixation system for bones wherein at least one passage hole in a bone connection carrier is only deformed by a preformed thread of a bone screw. Other metal devices for fixation to one or more bones that are living tissue in a human body, taught for example in U.S. Pat. No. 5,709,686, U.S. Pat. No. 5,904,683, and U.S. Pat. No. 7,179,260 B2 do not use self tapping thread cutting features with the bone screws they disclose.

A threaded fastener or screw 30 of the present invention may be made of any appropriate metallic material, so long as the metallic material has physical properties including hardness that allow the self tapping thread cutting threads 33 on the shank 37 of the shaft to cut the material of the hardware that the screw will be used to attach to a non metallic structure.

Figure 8:
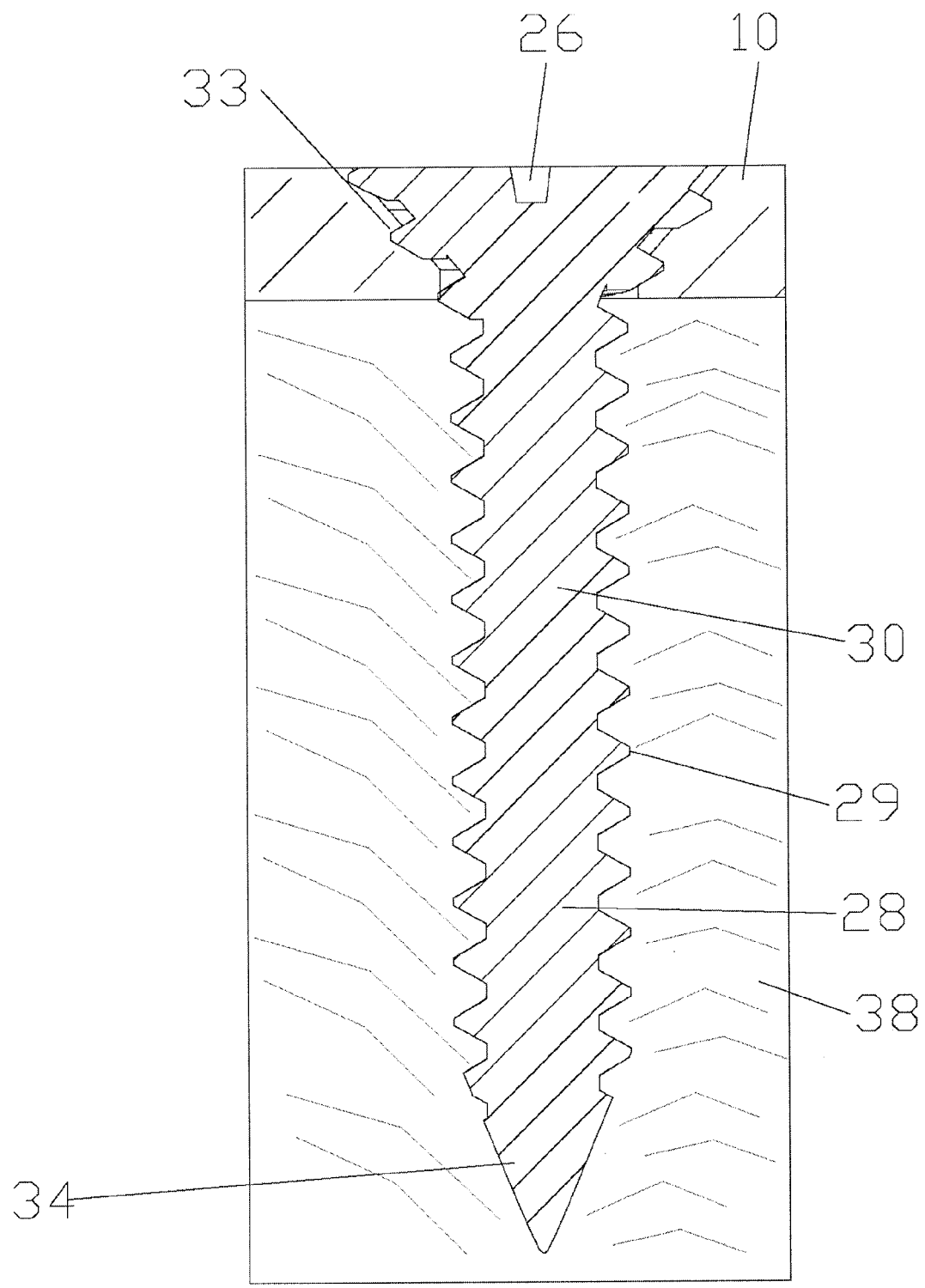
FIG. 8 is a schematic cross section of the screw of FIGS. 6 and 7 securing the prior art hinge of FIG. 1 to a wooden article.

Reference is again made to already described FIGS. 1-3 which show a prior art hinge 10 that is a metallic hardware device provided with a plurality of through holes 21-24 each having a wall that is tapered along at least a portion of its length in a manner that is commonly referred to as being countersunk. FIG. 8 is a schematic cross section of the new screw 30 of FIGS. 6 and 7 securing the prior art hinge 10 of FIGS. 1-3 to a wooden article 38. The wooden article 38 may be for example either a door hinge or a door to which a leaf of a hinge is attached. The shaft 28 of the thread 30 is provided with a thread 29 that is not a self tapping thread cutting thread. The screw 30 extends through a through hole 22 in a prior art hinge which is provided with a smooth, that is to say not threaded, counter sink 27 along a least a portion of the length of the through hole. Preferably a pilot hole is drilled in the wooden article 38 to facilitate the entry of the screw into the wood. The screw is driven into the wood by rotating the screw using a suitable tool that is complementary to a recess such as the slot 28 cross or other specially shaped recess to fit the tip of a screwdriver, wrench or drill driver bit in the head of the screw forcing the point 34 of the shaft to advance into the wood. The non cutting threads 29 on the shaft of the screw may deform the wood to secure the shaft of the screw to the wood. Unlike the prior art arrangement of FIG. 5 wherein a smooth shank of a prior art screw is adjacent to a smooth counter bore of a through hole so that the shank and counter bore are not interlocked, in the present invention the self tapping thread cutting thread 22 of the shank of the screw cuts into the counter bore of the through hole to remove material from the hinge with a resulting interlocking of the shank of the screw and the hinge by mating threads. Over time stresses put on the prior art assembly may cause the threads on the shaft of the prior art screw to damage the wood causing the screw to move and become displaced with respect to the hinge. The assembly of the present invention causes the orientation of the screw with respect to the hinge to remain constant so the shaft of the screw will not move from its original orientation with respect to a longitudinal axis of the screw to damage the surrounding wood, thus maintaining the metallic hardware in place with the wood for a longer time.

It is an advantage of this embodiment of the invention that prior at hardware devices provided with through holes that are at least partially countersunk may continue to be used without modification to the hardware. This prevents costly reworking of the tooling used to make such hardware. Existing inventories of such prior art hardware may be mounted to doors, door frames, drawers, and other items in a more secure manner using the present invention. It is a further advantage of the present invention that if a prior art hardware device, like the hinge 10 of FIGS. 1-3 that is fixed to an article comprising any suitable nonmetallic material selected from a group consisting of wood, particle board, plastic and fiberglass by a prior art screw with a smooth shank that is not interlocked with a prior art hardware device should be loosened due to damage to the nonmetallic article by the threads of the shank of the screw, the same prior art hardware device may be reattached to the article in a more secure manner using a screw of the invention having a self tapping thread cutting thread on the shank of the screw.

Figure 9:
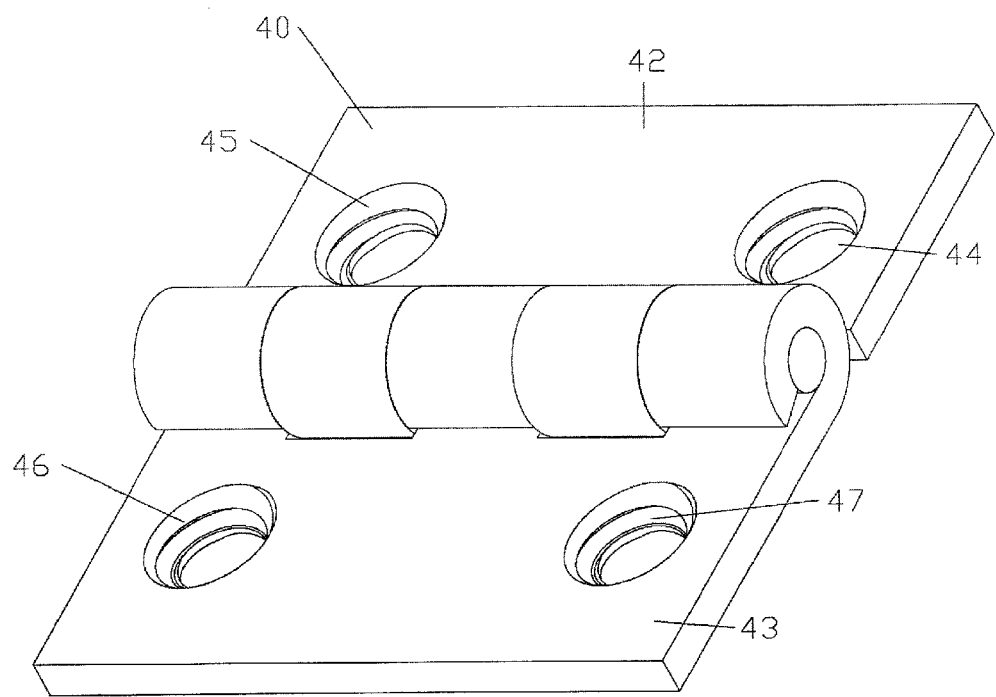
FIG. 9 is a perspective view of a hinge in which the through holes are threaded.
Figure 12:
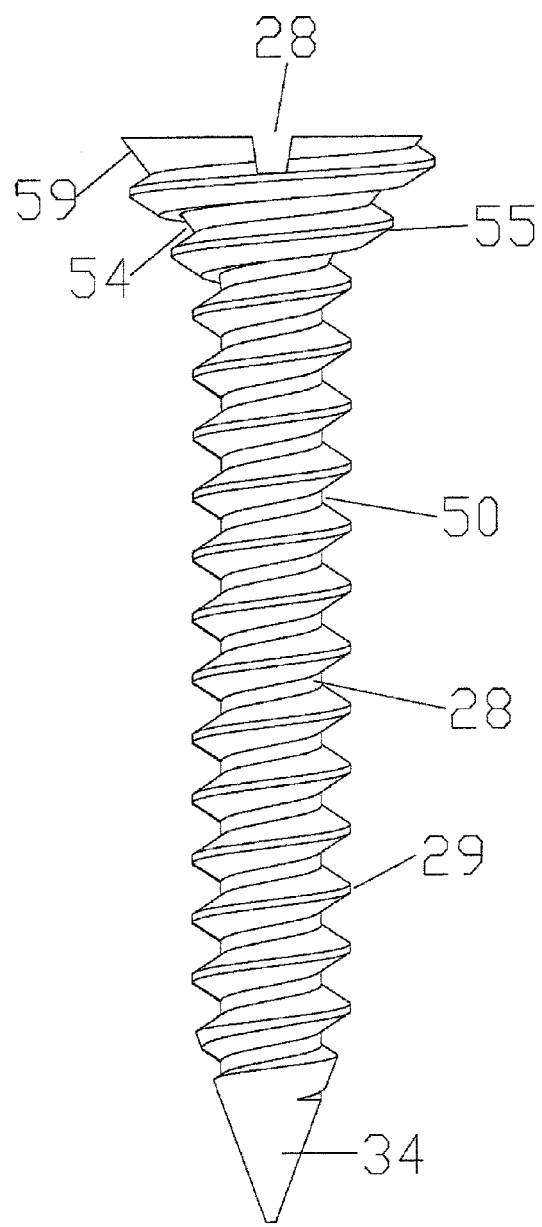
FIG. 12 is an elevation view another screw of the present invention having threads on the shank and head of the screw.
Figure 13:
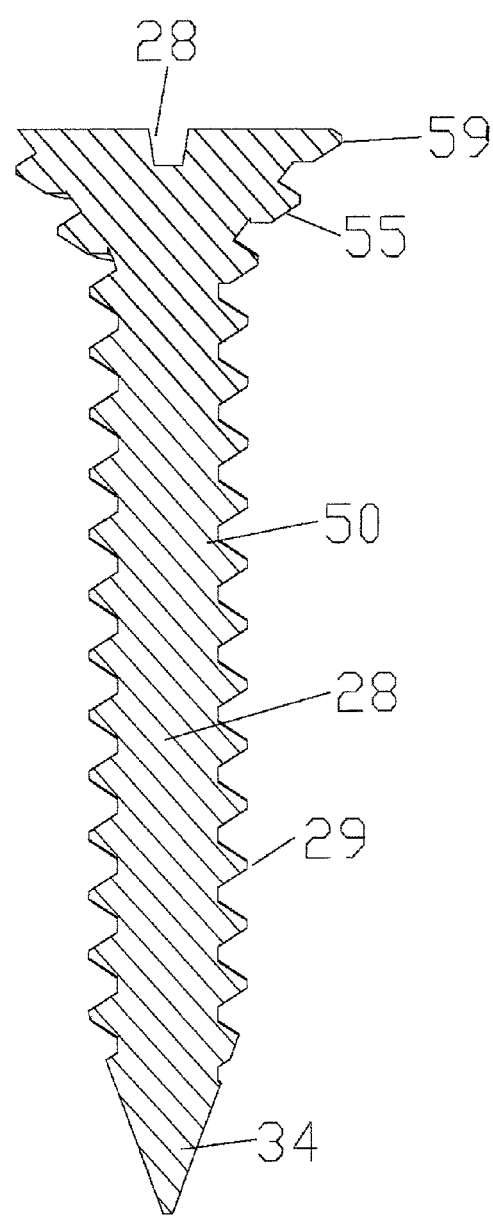
FIG. 13 is a cross section of the screw of FIG. 12.

There is provided in accordance with another aspect of the present invention a modified hardware device 40 shown if FIGS. 9-11. FIG. 9 is a perspective view of a hinge 40 in which the through holes 44-47 of the leaves 42, 43 of the hinge are provided with a thread 48 along at least a tapered portion of the countersunk through holes. FIG. 10 is a cross section of a threaded through hole 44 of a leaf 42 the hinge of FIG. 9. FIG. 11 is a top view looking down on a portion of a leaf 42 the hinge of FIG. 9 in the region of a through hole 44. Referring now to FIGS. 12 and 13 there is shown in FIG. 12 an elevation view another wood screw 50 of the present invention having threads 55 on the shank 54 by the head 59 of the screw, and FIG. 13 is a cross section of the screw 50 of FIG. 12. The screw 50 has a shaft 28 that is provided at one end with a point 34. A thread 38 that is not a self tapping thread cutting thread extends from the shaft 28. The head 59 of the screw is provided with recess such as a slot 28, cross or other specially shaped recess to fit the tip of a screwdriver, wrench or drill driver bit. The tapered shank 54 of the screw is provided with a thread that is not a self tapping thread cutting thread, with the thread 55 on the tapered shank being complementary with the thread 48 along at least a tapered portion of a countersunk through hole 44-47 in the hardware device 40.

Figure 14:
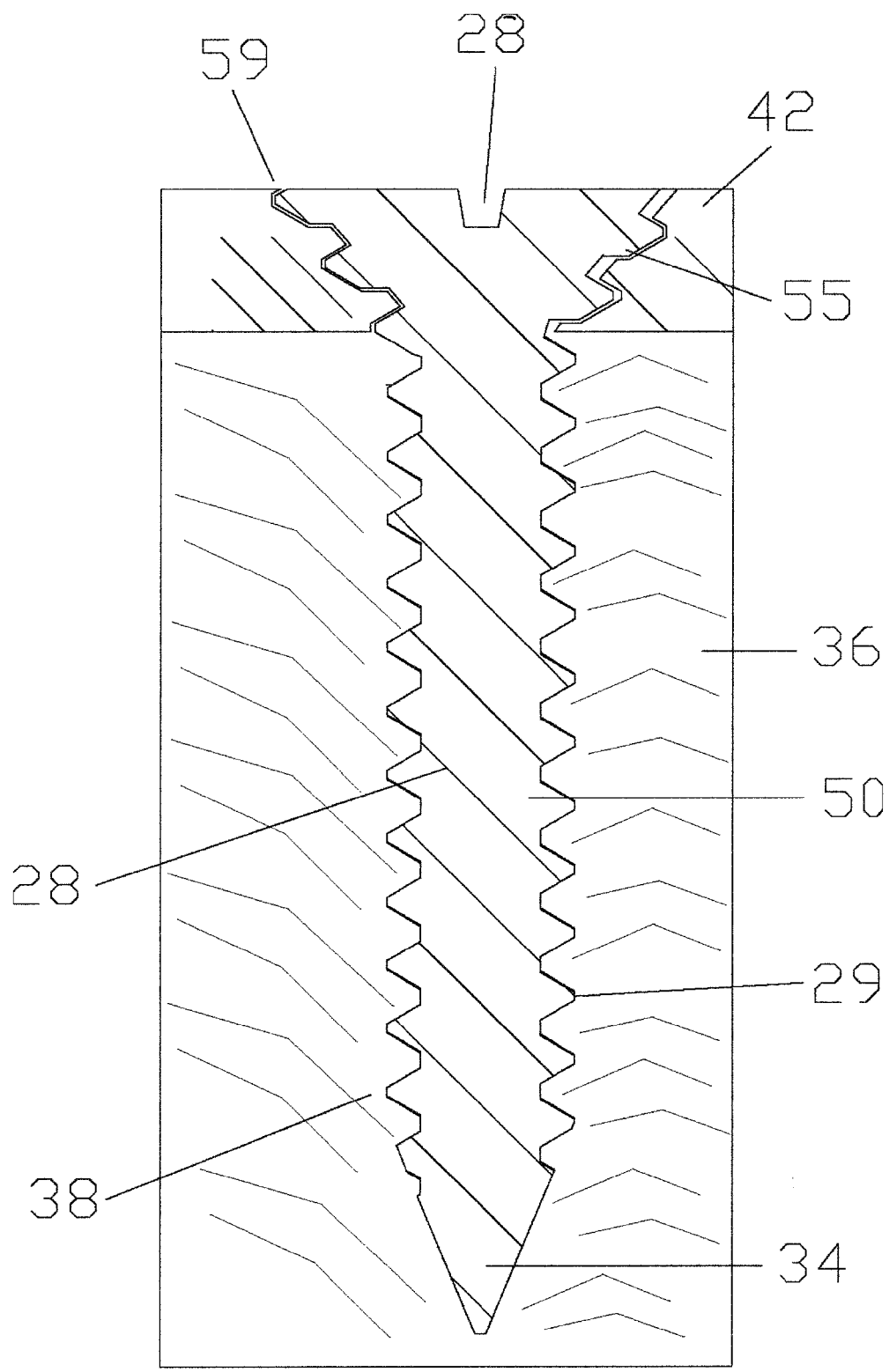
FIG. 14 is a fragmentary cross section of the screw of FIGS. 11 and 12 securing the hinge of FIG. 9 to a wooden article.

Referring next to FIG. 14 there is shown a fragmentary cross section of the screw 50 of FIGS. 11 and 12 securing a leaf 42, 43 of the hinge 40 of FIG. 9 to a wooden article 38 such as a door or a door frame. The screw 50 extends through a through hole 44-47 in the hinge 40 which is provided with a counter sink provided with threads 48 along a least a portion of the length of the through hole. Preferably a pilot hole is drilled in the wooden article 38 to facilitate the entry of the screw into the wood. The screw is driven into the wood by rotating the screw using a suitable tool that is complementary to recess such as the slot 28, cross or other specially shaped recess to fit the tip of a screwdriver, wrench or drill driver bit in the head of the screw forcing the point 34 of the shaft to advance into the wood. The non cutting thread 29 on the shaft of the screw may deform the wood to secure the shaft of the screw to the wood. As the screw continues to be rotate the thread 55 that is not a self tapping thread cutting thread engages the thread 48 along at least a tapered portion of the countersunk through hole such that the tapered shank 54 of the screw is interlocked with the hinge. The advantages of such an arrangement are like those disclosed above with respect to FIGS. 1-3 and 6-8.

Figure 15:
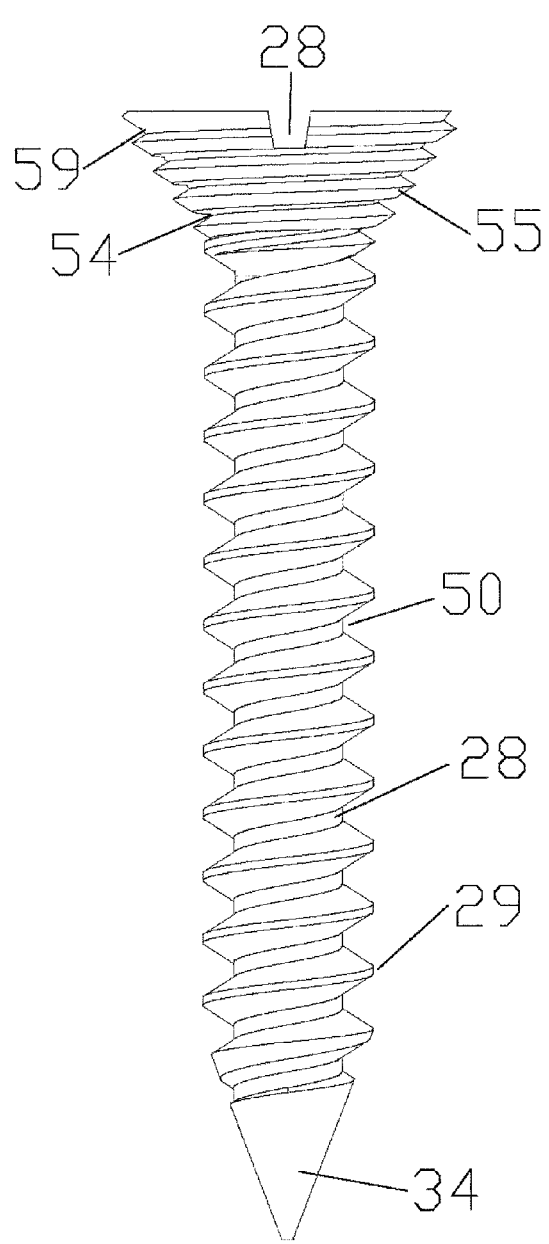
FIG. 15 shows a screw that is like the screw of FIG. 12 except that the thread of the shank has a different size and pitch from the thread on the shaft of the screw.
Figure 16:
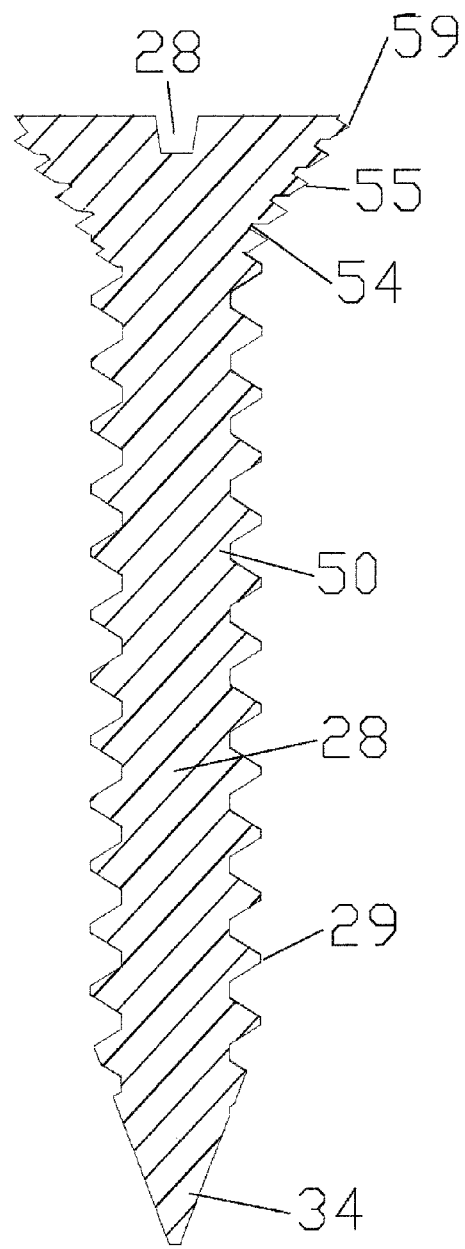
FIG. 16 is a cross section of the screw of FIG. 15.

FIG. 15 shows a screw 50 that is like the screw of FIG. 12 except that the thread 55 of the shank 54 have a different size and pitch from the thread 29 on the shaft 28 of the screw. As used herein and in the claims the pitch of a thread is understood to have its common meaning of the distance from one thread groove to the next, measured from crest to crest. FIG. 16 is a cross section of the screw of FIG. 15. The thickness of an article of hardware may often be less than the thickness of the article to which the hardware is to be fixed. To obtain a stronger interlock between the threads 55 on the shaft 54 of a screw and the threads on the tapered portion of a through hole in the article of hardware it may be advantageous to use a thread on the shank of the screw that has a different, usually smaller, and size from the thread 29 on the shaft 28 of the screw from the point 34 of the screw to the shank 54 of the screw. Of course the threads on the tapered portion of a through hole in the article of hardware should be complementary to the thread on the shaft of the screw. This arrangement results in a greater number of interlocking turns of the threads attaching the shank of the screw to the article of hardware.

Figure 17:
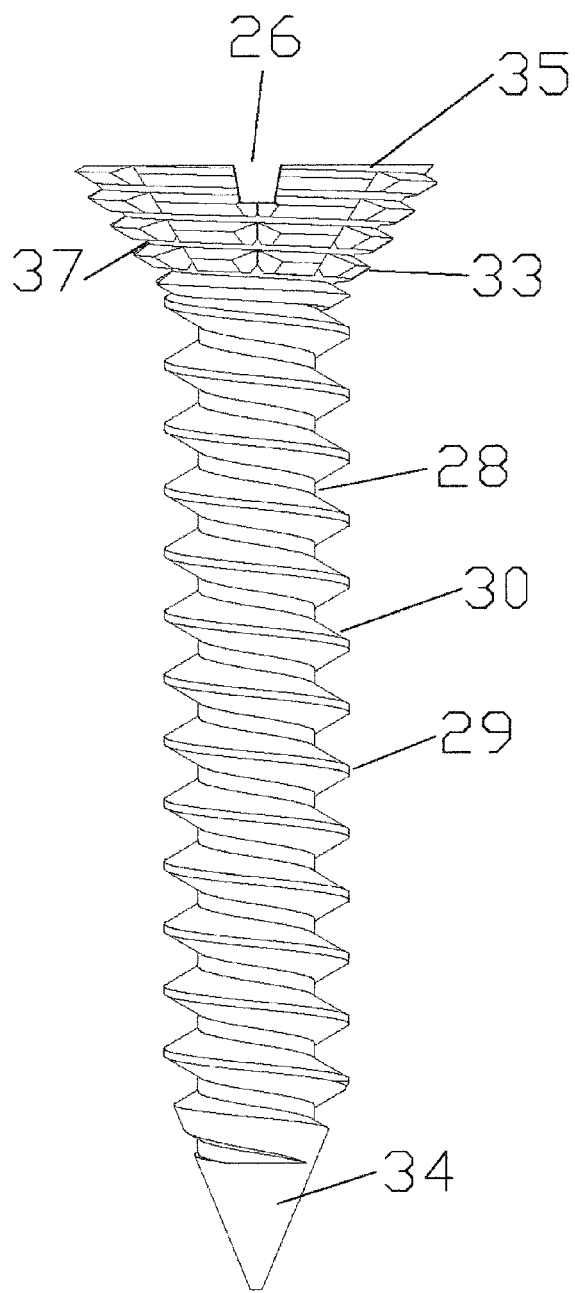
FIG. 17 shows a screw that is like the screw of FIG. 6 except that the self tapping thread cutting thread of the shank have a different size and pitch from the thread on the shaft of the screw.
Figure 18:
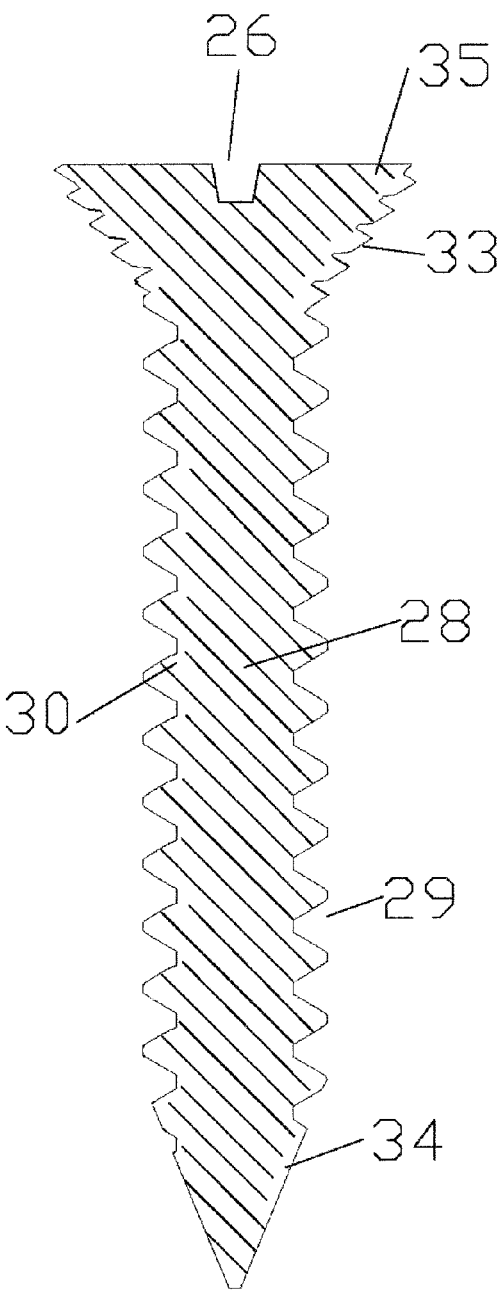
FIG. 18 is a cross section of the screw of FIG. 17.

FIG. 17 shows a screw 30 that is like the screw of FIG. 6 except that the self tapping thread cutting thread 33 of the shank 37 have a different size and pitch from the thread 29 that is not self tapping thread cutting thread on the shaft 28 of the screw. FIG. 18 is a cross section of the screw of FIG. 17. The thickness of an article of hardware may often be less than the thickness of the article to which the hardware is to be fixed. To obtain a stronger interlock between the shank 37 of a screw and the tapered portion of a non threaded through hole in the article of hardware it may be advantageous to use a self tapping thread cutting thread 33 on the shank of the screw that has a different, usually smaller, and size from the thread 29 on the shaft 28 of the screw from the point 34 of the screw to the shank 54 of the screw. This arrangement results in a greater number of interlocking turns of the threads attaching the shank of the screw to the article of hardware.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A system for attaching a hardware device to an article comprising:
    a metal hardware device that is provided with at least one through hole surrounded by a wall, at least a portion of the wall being a tapered wall;
    an nonmetallic article comprising a material selected from the group consisting of wood, particle board, plastic and fiberglass;
    a threaded fastener comprising a shaft with a tapered shank located at one end of the shaft and a point located at the other end of the shaft, a head of the threaded fastener adjoining the shank, the shaft is provided with a first thread having a first pitch and the shank is provided with a second thread having a second pitch that is equal to or less than the first pitch; and
    the threaded fastener extending through the through hole in the hardware device and into the article with the shaft of the threaded fastener interlocked with the article by the first thread on the shaft and the tapered shank of the threaded fastener interlocked with the tapered wall of the through hole of the hardware device by the second thread on the tapered shank of the threaded fastener whereby the metal hardware device is secured in direct contact with the nonmetallic article.

2. The system for attaching a hardware device to an article according to claim 1 wherein the second thread on the tapered shank of the threaded fastener is a self tapping thread cutting thread, and the first thread on the shaft of the threaded fastener is not a self tapping thread cutting thread, whereby the second thread on the tapered shank of the threaded fastener cuts threads in the tapered wall of the through hole of the metal hardware device when the threaded fastener is advanced into the nonmetallic article by rotating the threaded fastener.

3. The system for attaching a hardware device to an article according to claim 2 wherein the head of the threaded fastener is provided with a recess for mating with a complementary tool for causing rotation of the threaded fastener.

4. The system for attaching a hardware device to an article according to claim 2 wherein the shelf tapping thread cutting thread of the tapered shank has a pitch and the thread of the shaft that is not a self tapping thread cutting thread has a pitch that is not the same as the pitch of self tapping thread cutting thread of the tapered shank.

5. The system for attaching a hardware device to an article according to claim 2 wherein the metal hardware device is a hinge and the nonmetallic article is a door frame or a door.

6. The system for attaching a hardware device to an article according to claim 1 wherein the tapered wall of the through hole of the hardware device is provided with a thread that is complementary to the second thread on the tapered shank of the threaded fastener.

7. The system for attaching a hardware device to an article according to claim 6 wherein the head of the threaded fastener is provided with a recess for mating with a complementary tool for causing rotation of the threaded fastener.

8. The system for attaching a hardware device to an article according to claim 6 wherein thread of the tapered shank of the threaded fastener has a pitch and the thread of the shaft of the threaded fastener has a pitch that is not the same as the pitch of the thread of the tapered shank of the threaded fastener.

9. The system for attaching a hardware device to an article according to claim 6 wherein the metal hardware device is a hinge and the nonmetallic article is a door frame or a door.

10. The system for attaching a hardware device to an article according to claim 1 wherein the head of the threaded fastener is provided with a recess for mating with a complementary tool for causing rotation of the threaded fastener.

11. The system for attaching a hardware device to an article according to claim 1 wherein thread of the tapered shank of the threaded fastener has a pitch and the thread of the shaft of the threaded fastener has a pitch that is not the same as the pitch of the thread of the tapered shank of the threaded fastener.

12. The system for attaching a hardware device to an article according to claim 1 wherein the metal hardware device is a hinge and the nonmetallic article is a door frame or a door.

13. A system for attaching a hardware device to an article comprising:
    a metal hardware device that is provided with at least one through hole surrounded by a wall, at least a portion of the wall being a tapered wall;
    an nonmetallic article comprising a material selected from the group consisting of wood, particle board, plastic and fiberglass;
    a threaded fastener comprising a shaft with a tapered shank located at one end of the shaft and a point located at the other end of the shaft, a head of the threaded fastener adjoining the shank, the shaft is provided with a first thread that is not a self tapping thread cutting thread and the shank is provided with a second thread that is a self tapping thread cutting thread, the first thread having a first pitch and the second thread having a second pitch with the second pitch being equal to or less than the first pitch;
    the threaded fastener extending through the through hole in the metal hardware device and into the nonmetallic article whereby the second thread on the tapered shank of the threaded fastener cuts complementary threads in the tapered wall of the through hole of the metal hardware device when the threaded fastener is advanced into the article by rotating the threaded fastener and the shaft of the threaded fastener is interlocked with the nonmetallic article by the first thread on the shaft and the tapered shank of the threaded fastener is interlocked with the tapered wall of the through hole of the metal hardware device by the second thread on the tapered shank of the threaded fastener and the complementary thread cut in the tapered wall of the through hole of the hardware device whereby the metal hardware device is secured in direct contact with the nonmetallic article.

14. The system for attaching a hardware device to an article according to claim 13 wherein the shelf tapping thread cutting thread of the tapered shank has a pitch and the thread of the shaft that is not a self tapping thread cutting thread has a pitch that is not the same as the pitch of self tapping thread cutting thread of the tapered shank.

15. The system for attaching a hardware device to an article according to claim 14 wherein the head of the threaded fastener is provided with a recess for mating with a complementary tool for causing rotation of the threaded fastener.

16. The system for attaching a hardware device to an article according to claim 14 wherein the hardware device is a hinge and the article is a door frame or a door.

17. The system for attaching a hardware device to an article according to claim 13 wherein the head of the threaded fastener is provided with a recess for mating with a complementary tool for causing rotation of the threaded fastener.

18. The system for attaching a hardware device to an article according to claim 13 wherein the metal hardware device is a hinge and the nonmetallic article is a door frame or a door.

19. A system for attaching a hardware device to an article comprising:
   a metal hardware device that is provided with at least one through hole surrounded by a wall, at least a portion of the wall being a tapered wall that is provided with a thread;
   an nonmetallic article comprising a material selected from the group consisting of wood, particle board, plastic and fiberglass;
   a threaded fastener comprising a shaft with a tapered shank located at one end of the shaft and a point located at the other end of the shaft, a head of the threaded fastener adjoining the shank, the shaft is provided with a first thread and the shank is provided with a second thread that is complementary to the thread of the tapered wall of the through hole of the hardware device, the first thread having a first pitch and the second thread having a second pitch that is equal to or less than the first pitch; and
   the threaded fastener extending through the through hole in the metal hardware device and into nonmetallic the article with the shaft of the threaded fastener interlocked with the article by the first thread on the shaft and second thread on the tapered shank of the threaded fastener interlocked with the thread of the tapered wall of the through hole of the hardware device whereby the metal hardware device is secured in direct contact with the nonmetallic article.

20. The system for attaching a hardware device to an article according to claim 19 wherein thread of the tapered shank of the threaded fastener has a pitch and the thread of the shaft of the threaded fastener has a pitch that is not the same as the pitch of the thread of the tapered shank of the threaded fastener.

21. The system for attaching a hardware device to an article according to claim 20 wherein the head of the threaded fastener is provided with a recess for mating with a complementary tool for causing rotation of the threaded fastener.

22. The system for attaching a hardware device to an article according to claim 19 wherein the head of the threaded fastener is provided with a recess for mating with a complementary tool for causing rotation of the threaded fastener.

23. The system for attaching a hardware device to an article according to claim 19 wherein the metal hardware device is a hinge and the nonmetallic article is a door frame or a door.

\* \* \* \* \*